US012732887B2

(12) United States Patent
Zhu et al.

(10) Patent No.: US 12,732,887 B2
(45) Date of Patent: Sep. 8, 2026

(54) COMMUNICATION RANGE ENHANCEMENT METHOD

(71) Applicant: Beken Corporation, Shanghai (CN)

(72) Inventors: Mengxing Zhu, Shanghai (CN); Yantao Li, Shanghai (CN); Jiewei Zheng, Shanghai (CN); Tongxin Zhang, Shanghai (CN); Guochu Chen, Shanghai (CN)

(73) Assignee: Beken Corporation, Shanghai (CN)

( * ) Notice: Subject to any disclaimer, the term of this patent is extended or adjusted under 35 U.S.C. 154(b) by 363 days.

(21) Appl. No.: 18/395,373

(22) Filed: Dec. 22, 2023

(65) Prior Publication Data

US 2025/0193766 A1 Jun. 12, 2025

(30) Foreign Application Priority Data

Dec. 11, 2023 (CN) ......................... 202311699899.6

(51) Int. Cl.
*H04W 40/12* (2009.01)
*H04W 84/12* (2009.01)

(52) U.S. Cl.
CPC ............ *H04W 40/12* (2013.01); *H04W 84/12* (2013.01)

(58) Field of Classification Search
None
See application file for complete search history.

(56) References Cited

U.S. PATENT DOCUMENTS

2015/0351010 A1* 12/2015 Kumar .................. H04W 48/16 455/434
2016/0261332 A1* 9/2016 Bodas ................ H04B 7/15507
2020/0344800 A1* 10/2020 Reuche ................. H04W 24/10
2024/0305358 A1* 9/2024 Yang .................. H04B 7/15542

* cited by examiner

*Primary Examiner* — Lonnie V Sweet
(74) *Attorney, Agent, or Firm* — Schwegman Lundberg & Woessner, P.A.

(57) ABSTRACT

The present disclosure addresses a system and a method for enhancing a communication range between a first device and a second device communicatively coupled to the first device. The method includes scanning within a first range of the first device to determine a first list of connectable devices; instructing, by the first device, the second device to scan within a second range of the second device to determine a second list of connectable devices; receiving, by the first device, the second list of connectable devices from the second device; determining, by the first device, a target device based on the first list of connectable devices and the second list of connectable devices; and establishing, by the first device, a communication with the second device via the target device.

19 Claims, 8 Drawing Sheets

602

| SSID | Password | Signal Strength |
|---|---|---|
| Router A | No | Weak |
| Router B | 12345678 | Medium |
| Router C | 66666666 | Strong |
| Router D | No | Medium |
| Router E | Unknown | Strong |

604

| SSID | Password | Signal Strength |
|---|---|---|
| Router A | No | Medium |
| Router B | 12345678 | Weak |
| Router C | Unknown (66666666) | Strong |
| Router D | No | Strong |
| Router F | 22334455 | Medium |

FIG. 6

COMMUNICATION RANGE ENHANCEMENT METHOD

CROSS REFERENCE TO RELATED APPLICATION

This application claims priority to and incorporates by reference Chinese patent application no. 202311699899.6 filed 11 Dec. 2023.

TECHNICAL FIELD

The present disclosure generally relates to wireless communication technology. In particular, example embodiments of the present disclosure address systems and methods for enhancing a communication range between wireless devices.

BACKGROUND

Wireless communication technologies are prevalent in the modern technology era. Wireless connectivity, enabled by protocols like Wi-Fi, Bluetooth, and cellular networks, allows devices to communicate without physical cable connections. This has spurred a significant growth of wireless devices and applications in homes, businesses, and industrial systems and across consumer electronics, Internet of Things (IoT), and automation.

While wireless standards continually improve in speed and reliability, range limits remain a constraint for many uses and applications. The usable range of a wireless device typically depends on factors such as transmission power, antenna design, and environmental interference. Among these factors, the transmission power is often the most straightforward one to modify. However, while increasing transmission power can enhance range, it also greatly increases energy consumption and produces excessive heat. For systems prioritizing energy efficiency and thermal management, an alternative method to enhance the communication range is desired.

SUMMARY

In one aspect, a method for enhancing a communication range between a first device and a second device communicatively coupled to the first device is provided. The method includes scanning within a first range of the first device to determine a first list of connectable devices, instructing, by the first device, the second device to scan within a second range of the second device to determine a second list of connectable devices, receiving, by the first device, the second list of connectable devices from the second device, determining, by the first device, a target device based on the first list of connectable devices and the second list of connectable devices, and establishing, by the first device, a communication with the second device via the target device.

In one aspect, a computing apparatus is provided. The computing apparatus includes a processor and a memory storing instructions. When executed by the processor, the instructions configure the apparatus to scan within a first range of a first device to determine a first list of connectable devices, instruct, by the first device, a second device to scan within a second range of the second device to determine a second list of connectable devices, receive, by the first device, the second list of connectable devices from the second device, determine, by the first device, a target device based on the first list of connectable devices and the second list of connectable devices, and establish, by the first device, a communication with the second device via the target device.

In one aspect, a non-transitory computer-readable storage medium is provided. The computer-readable storage medium includes instructions that when executed by a computer, cause the computer to scan within a first range of a first device to determine a first list of connectable devices, instruct, by the first device, a second device to scan within a second range of the second device to determine a second list of connectable devices, receive, by the first device, the second list of connectable devices from the second device, determine, by the first device, a target device based on the first list of connectable devices and the second list of connectable devices, and establish, by the first device, a communication with the second device via the target device.

BRIEF DESCRIPTION OF THE DRAWINGS

To easily identify the discussion of any particular element or act, the most significant digit or digits in a reference number refer to the figure number in which that element or act is first introduced.

FIG. 6 illustrates two example lists of scanned surrounding devices, in accordance with some example embodiments.

DETAILED DESCRIPTION

Figure 1:
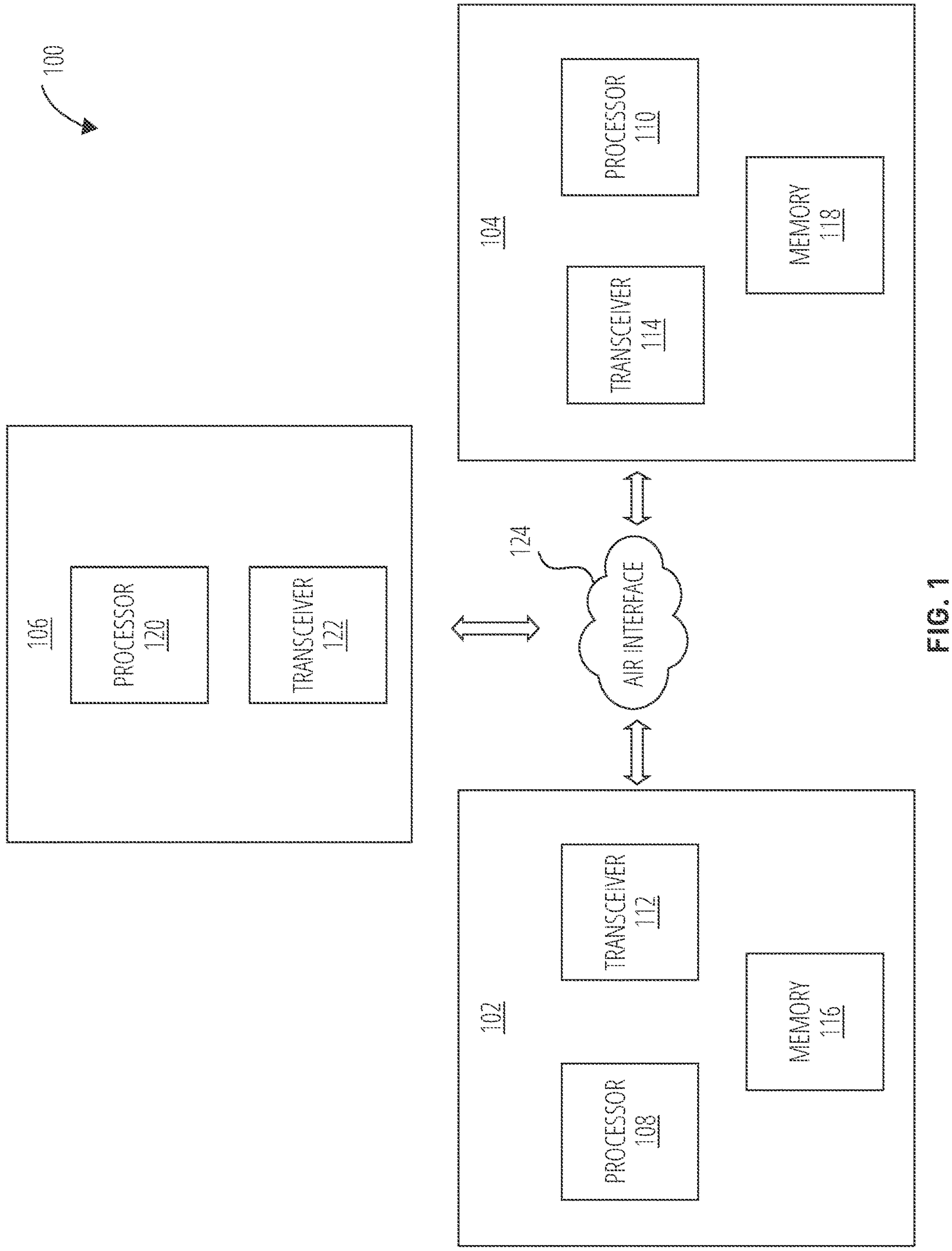
FIG. 1 is a block diagram illustrating a wireless communication environment, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, the limited range of wireless communications presents challenges for many applications and a communication range enhancement method that works within existing device power and thermal constraints is desired.

The present disclosure provides systems and methods for enhancing a communication range between wireless devices using relay device, such as router devices. Initially, two wireless devices, Device A and Device B, may directly communicate within their wireless communication ranges. When Device B begins to or is about to move out of a communication range of Device A, Device A may detect that signal strength of Device B decreases and determine that the communication range needs to be enhanced. The signal strength may be measured as a ratio in decibels (−dBm) of a measured power to one milliwatt. Alternatively, the signal strength may be measured in terms of Received Signal Strength Indicator (RSSI) which is a relevant index defined by the chip manufacturer. It should be noted that the current method may be performed even if there is no detection of the drop of signal strength of Device B. In such scenarios, a relay communication can be established as a backup option to the original communication. The Device A and Device B may switch to the relay communication whenever needed.

In response to the detection that B begins to or is about to move out of the communication range, Device A may scan its surrounding router devices and generate a first list of connectable router devices. Device A can then instruct Device B to also scan for connectable router devices within its communication range. In response to receiving the scan instruction, Device B may scan and send a second list of connectable router devices back to Device A. In some examples, Device A may send the first list to Device B together with the instruction of scan, such that Device B can detect devices that were not originally detectable or connectable. Similarly, Device B's second list can contain new router devices that were not originally detectable or connectable by Device A on its initial scan. The order of scans can be interchanged, e.g., Device A can instruct Device B to scan and send the second list of connectable router devices back before it scans its surrounding router devices and generate the first list.

By comparing the two router lists, Device A can identify one or more routers that are connectable by both devices. A target router device can be selected among the one or more routers based on criteria such as signal strengths between the Device A/Device B and the one or more routers. After a target router is selected, both devices may connect to the target router. After the connections are established successfully, the communication between Device A and Device B can be relayed through the target router device even if Device B has moved out of the initial communication range of Device A. If the target router device's signal strength drops below a threshold or is no longer working, the devices can scan for and switch to a substitute router device with a stronger signal. The substitute router device can be selected among the one or more routers from the lists that are connectable by both device or be determined by additional scans.

The present disclosure potentially has at least the following advantages:

1. Increases wireless communication range without requiring higher transmission power or generating excessive heat.
2. Enables new applications where expanded wireless range is beneficial, such as remote system control, wider home/business coverage, and improved connections for mobile devices.
3. Improves reliability and stability of wireless connections for highly mobile devices like drones or robots.
4. Provides a cost-effective range enhancement solution by utilizing existing router devices rather than requiring specialized long-range wireless hardware.

FIG. 1 is a block diagram illustrating a wireless communication environment 100, in accordance with some example embodiments. The wireless communication environment 100 may include a first device 102 (also referred to as Device A), a second device 104 (also referred to as Device B), and a router device 106. The first device 102 and second device 104 may be any devices capable of wireless communication, such as smartphones, computers, Internet of Things (IoT) devices, drones, robots, etc. The first device 102 and the second device 104 may be the same type of devices (e.g., two mobile phones) or different types of devices (e.g., a controller and a drone). The first device 102 and second device 104 can communicate directly with each other within a limited communication range.

The router device 106 is a relay device that forwards data packets between devices in the same network environment. The router device 106 connects the first device 102 and second device 104 to enable communication between them. The router device 106 enhances the limited direct communication range between the first device 102 and second device 104 by providing an alternate path. While a router device is described here, it should be noted that other types of devices may also be used to relay communication between the first device 102 and second device 104 and such configuration is within the protection scope of the present disclosure. For example, wireless repeaters, bridges, access points, mesh networking nodes, or another user device (e.g., a third device similar to the first device 102 and the second device 104), etc. could potentially be used here.

The first device 102 may include a processor 108, a transceiver 112, and a memory 116. The processor 108 controls the overall operation and functions of the first device 102. The processor 108 may execute program instructions stored in the memory 116 to perform tasks such as initializing/terminating communications, scanning for nearby devices, generating a list of connectable devices, comparing lists of connectable devices, selecting a target router device from one or more candidate router devices, connecting to the target router device (e.g., router device 106), and transmitting signals to or receiving signals from the second device 104 through the router device 106. The processor 108 may monitor the signal strength of transmissions received from the second device 104 and determine whether an extended communication range is needed. The processor 108 may also monitor the signal strength of transmissions received from the router device 106 to determine if a substitute router device is needed to relay the communication between the first device 102 and the second device 104.

The transceiver 112 enables the first device 102 to communicate with internal devices in the wireless communication environment 100, such as the second device 104 and the router device 106, or external devices. The transceiver 112 may include components like a radio frequency (RF) amplifier, an oscillator, a filter, a mixer, and/or an antenna for transmitting and receiving wireless signals. The transceiver 112 may scan for router device signals to detect nearby router devices. The transceiver 112 enables the first device 102 to communicate with the second device 104 directly or through the router device 106. Direct communication refers to communication between the first device 102 and second device 104 via the air interface 124. Relayed communication through the router device 106 refers to a chain of two communications—one between the first device 102 and router device 106 via the air interface 124, and another between the second device 104 and router device 106 via the air interface 124.

The memory 116 of the first device 102 stores program instructions and data necessary for operation. The memory 116 may include non-volatile storage like flash memory or a hard disk, and volatile storage like random-access memory (RAM). The memory 116 may store instructions for execution by the processor 108 and may cache data such as lists of connectable router devices scanned by the first device 102 or second device 104. The memory 116 may also store credentials (e.g., Service Set Identifier (SSID), password) and signal strengths of the connectable router devices. Example lists of connectable router devices may be found in FIG. 6.

Similar to the first device 102, the second device 104 includes a processor 110, a transceiver 114 and a memory 118. The processor 110 controls the overall operation and functions of the second device 104. The processor 110 executes program instructions stored in the memory 118 to perform tasks such as scanning for nearby router devices when instructed by the first device 102, generating a list of connectable router devices, and sending this list to the first device 102. The processor 110 also controls the transceiver 114 to connect to a target router device (e.g., router device 106) selected by the first device 102 and communicate with the first device 102 through the target router device. The transceiver 114 enables the second device 104 to communicate with internal devices of the wireless communication environment 100, such as the second device 102 and the router device 106, or external devices. The transceiver 114 may also be controlled to scan for router device signals within the vicinity of the second device 104. The memory 118 stores program instructions and data needed for the second device's operations. The memory 118 may cache data such as lists of connectable router devices scanned by the first device 102 or second device 104. The memory 116 may also store credentials (e.g., SSID, password) and signal strengths of the connectable router devices.

Similar to the processor 108 and the processor 110, a processor 120 of the router device 106 may control the overall operation and functions of the router device 106. The processor 120 may execute program instructions stored in a memory thereof to handle tasks such as initializing connections, broadcasting signals, managing network traffic, and routing communications between devices (e.g., the first device 102 and the second device 104) connected to the router device 106.

Similar to the transceiver 112 and the transceiver 114, a transceiver 122 of the router device 106 may enable wireless communication with devices such as the first device 102 and second device 104. The transceiver 122 may include components such as a radio frequency (RF) amplifier, an oscillator, a filter, a mixer, and/or an antenna to send and receive wireless signals that allow the router device 106 to communicate over the air interface 124. The transceiver 122 facilitates communications between the first device 102 and second device 104.

The air interface 124 refers to the radio frequency spectrum used for wireless communications among the first device 102, the second device 104, and the router device 106. The air interface 124 may include the standards, protocols, and technologies that define how data is formatted and transmitted wirelessly. For example, the air interface 124 may employ a Wi-Fi network under an IEEE 802.11 standard (e.g., 802.11, 802.11b, 802.11a, 802.11g, 802.11n, 802.11ac, 802.11ax, 802.11be, etc.). Alternatively, or additionally, the air interface 124 may employ a Bluetooth, a ZigBee, a Z-Wave, a LPWAN, a RFID, a NFC, etc. The network used for the communication between the first device 102 and the second device 104 can be same or different from that used for the communication between the router device 106 and the first device 102/second device 104.

It should be noted that the term connectable devices in the present disclosure may be used interchangeably with discoverable devices. In other words, a device may be considered as a connectable device if it can be discovered in a scan of the first device 102 or the second device 104, even if the device's password is unknown to the first device 102 or the second device 104.

Figure 2:
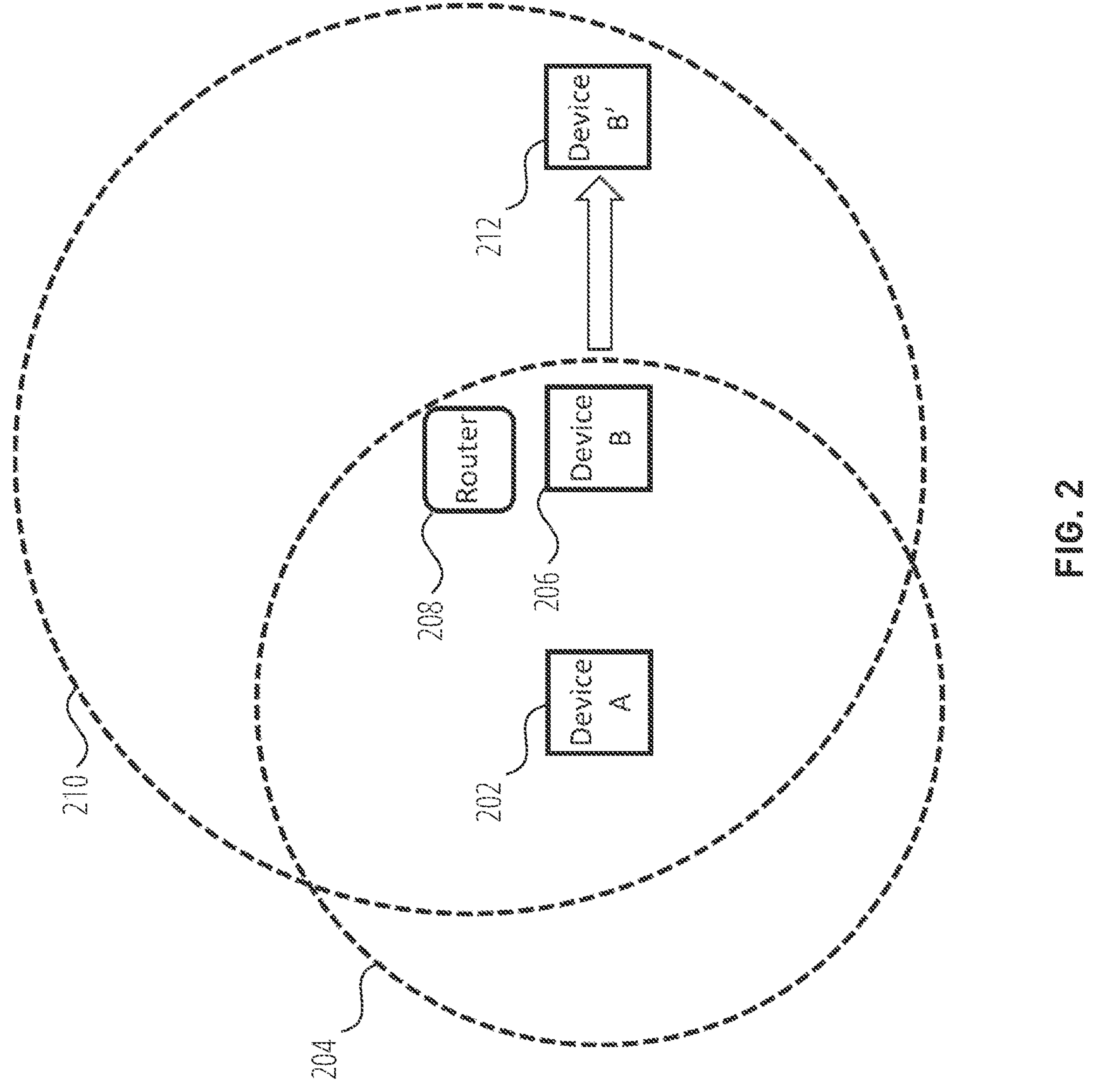
FIG. 2 is a schematic diagram illustrating enhancing a communication range between two devices using a router device, in accordance with some example embodiments.

FIG. 2 is a schematic diagram illustrating enhancing a communication range between two devices using a router device, in accordance with some example embodiments.

At the beginning, two devices, Device A 202 and Device B 206, are directly connected to each other wirelessly with a limited communication range 204. Device A 202 may be stationary while the Device B 206 may be moving. As the Device B 206 approaches the boundary of the communication range 204, the strength of signals it transmits to the Device A 202 drops below a threshold (e.g., −90 dBm, −80 dBm). By monitoring the received signal strength, the Device A 202 can detect that the Device B 206 is about to move out of the communication range 204.

Rather than allowing the connection to cease, the two devices can take actions to enhance the communication range. Specifically, both devices can scan to discover nearby wireless router devices. The Device A 202 and the Device B 206 may generate a list of connectable router devices, including the network identifiers and credentials of the router devices. The two devices may exchange the lists of discovered router devices together with the network identifiers and credentials. By comparing the two lists, the Device A 202 can select a target router device (e.g., the Router 208) that is within range of and has a high signal strength to both devices.

The Device A 202 and the Device B 206 may then connect to the selected target Router 208. The Router 208 may have a wider overall communication range 210 that covers both the original position of Device B 206 as well as its new position (labelled as Device B' 212). After connecting to the Router 208, the Device A 202 and Device B 206 can continue communicating seamlessly even when Device B moves outside the communication range 204. In such scenarios, Router 208 relays signals between the two devices, acting as a bridge to enhance the effective communication range between Device A 202 and Device B 206.

Figure 3:
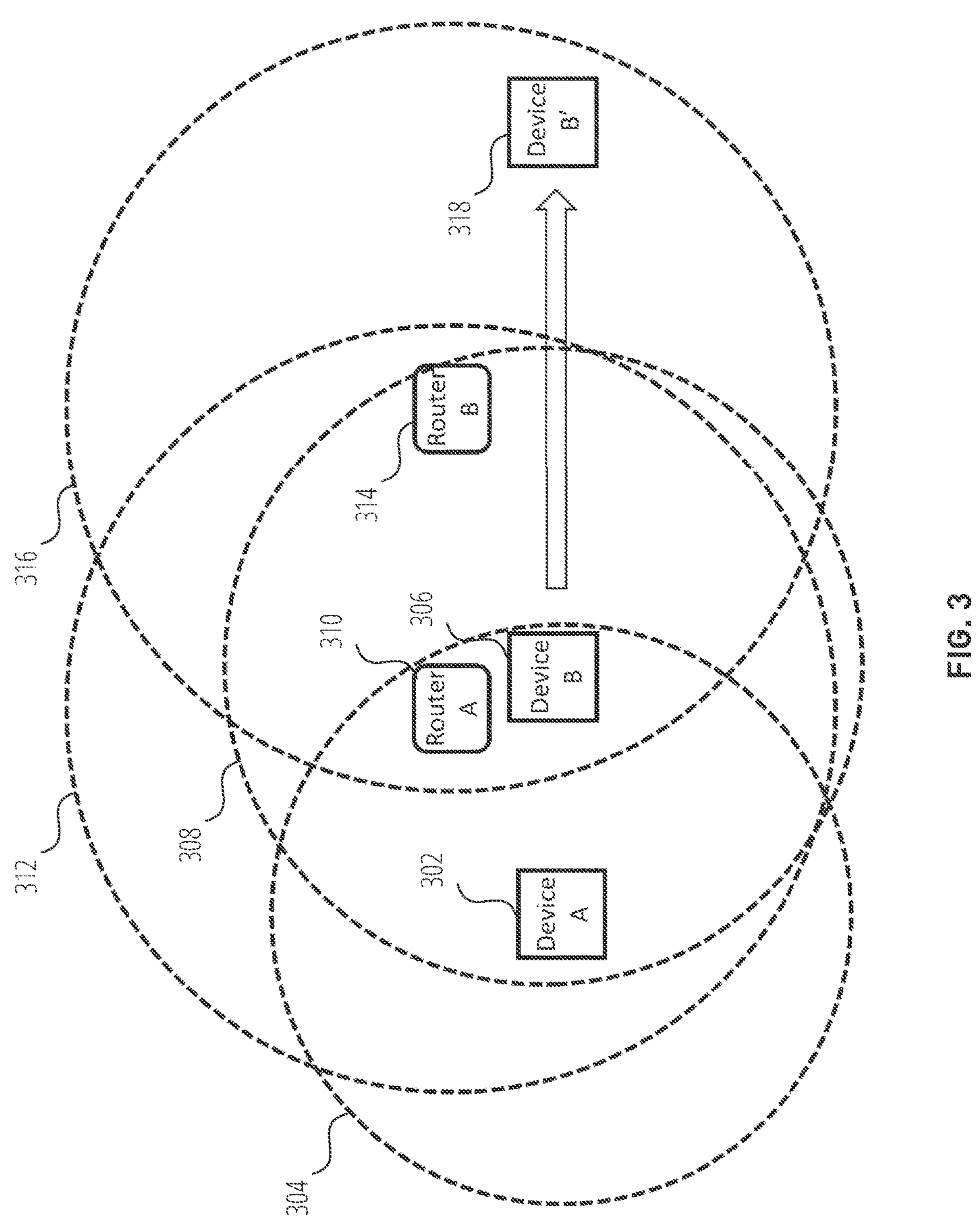
FIG. 3 is a schematic diagram illustrating enhancing a communication range between two devices using two router devices, in accordance with some example embodiments.

FIG. 3 is a schematic diagram illustrating enhancing a communication range between two devices using two router devices, in accordance with some example embodiments.

Similar to the Device A 202 and the Device B 206, Device A 302 and Device B 306 are directly connected wirelessly within limited communication ranges 304 and 308. The Device A 302 is stationary while the Device B 306 is moving. When the Device A 302 detects that the Device B 306 is about to move out of range 304, the Device A 302 and the Device B 306 may scan for and generate lists of connectable router devices as described previously. By comparing the lists, Device A 302 may identify two target router devices (e.g., Router A 310 and Router B 314). Router A 310's communication range 312 may cover both Device A 302 and Device B 306 while the Router B 314's communication range 316 covers Router device A 310 and Device B 306. In other words, both Router A 310 and Router B 314 are within the communication range 308 of Device B 306 while only Router A 310 is within the communication range 304 of the Device A 302. When Device B 306 moves from the original location to a further location (labelled as Device B' 318), Device A 302 may communicate with Device B 306 through a chain of relayed communications via the Router A 310 and Router B 314.

Figure 4:
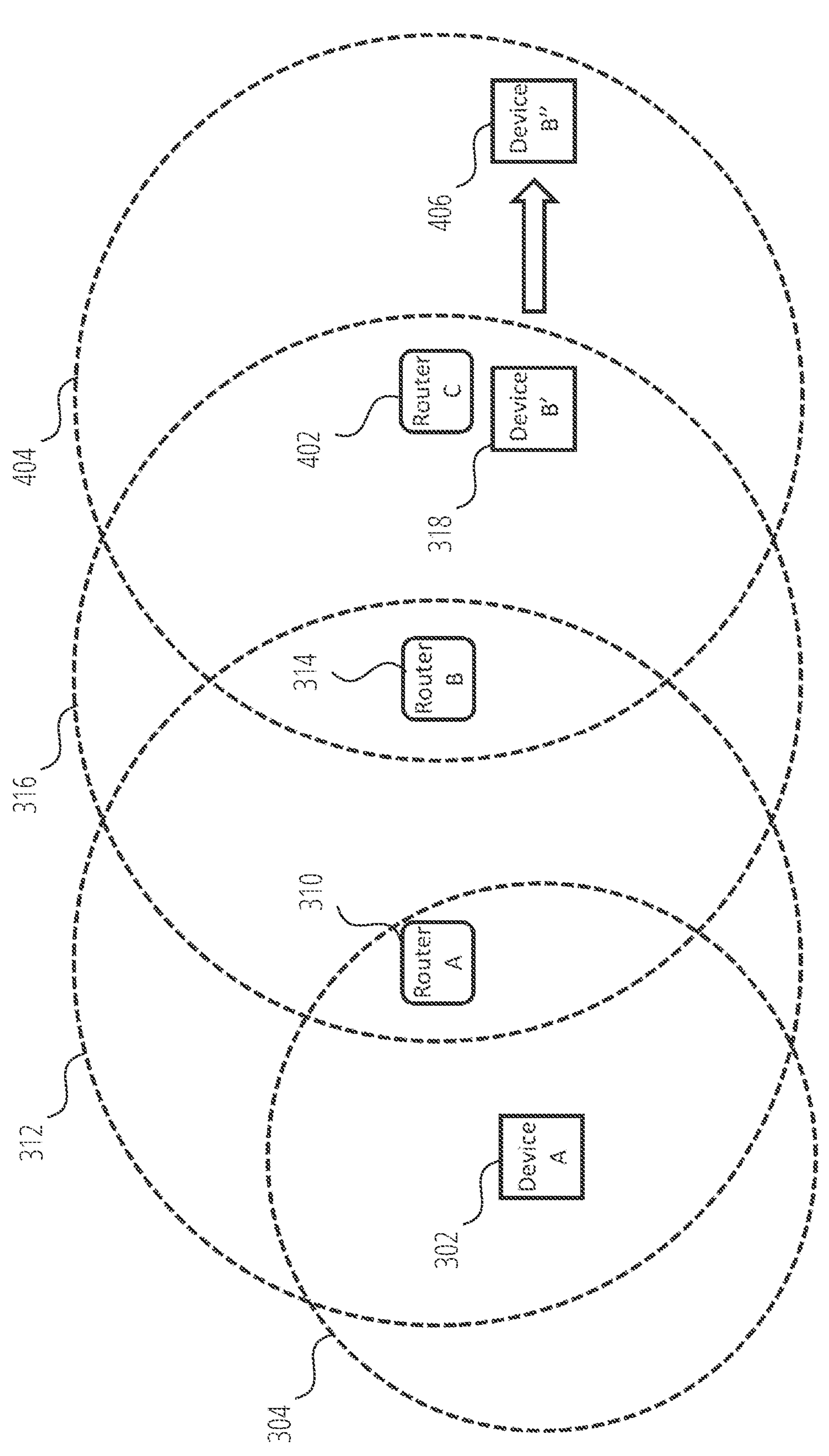
FIG. 4 is a schematic diagram illustrating enhancing a communication range between two devices using multiple router devices, in accordance with some example embodiments.

FIG. 4 is a schematic diagram illustrating enhancing a communication range between two devices using multiple router devices, in accordance with some example embodiments. As shown in FIG. 4, the Device A 302 is at its original position while the Device B 306 has moved to its new position (labelled as Device B' 318). The Router B 314 may detect that the strength of signals received from Device B' 318 drops below a threshold and determines that the Device B' 318 is about to move out of communication range 316. Accordingly, the Router B 314 may send the determination to the Device A 302 and the Device A 302 can send instructions to both Router B 314 and Device B' 318 to cause them to scan nearby connectable router devices. The Router B 314 and Device B' 318 may each generate a list of connectable router devices and transmit the list back to the Device A 302. The Device A 302 can choose a target router device, e.g., Router C 402 based on the lists and instruct the Router B 314 and the Device B' 318 to both connect with the Router C 402. The communication range 404 of the Router C 402 may cover the Router B 314 and the Device B' 318. When Device B 306 moves from the new location (labelled as Device B' 318) to an even further location (labelled as Device B" 406), Device A 302 may communicate with Device B 306 through a chain of relayed communications via the Router A 310, Router B 314, and Router C 402.

Figure 5:
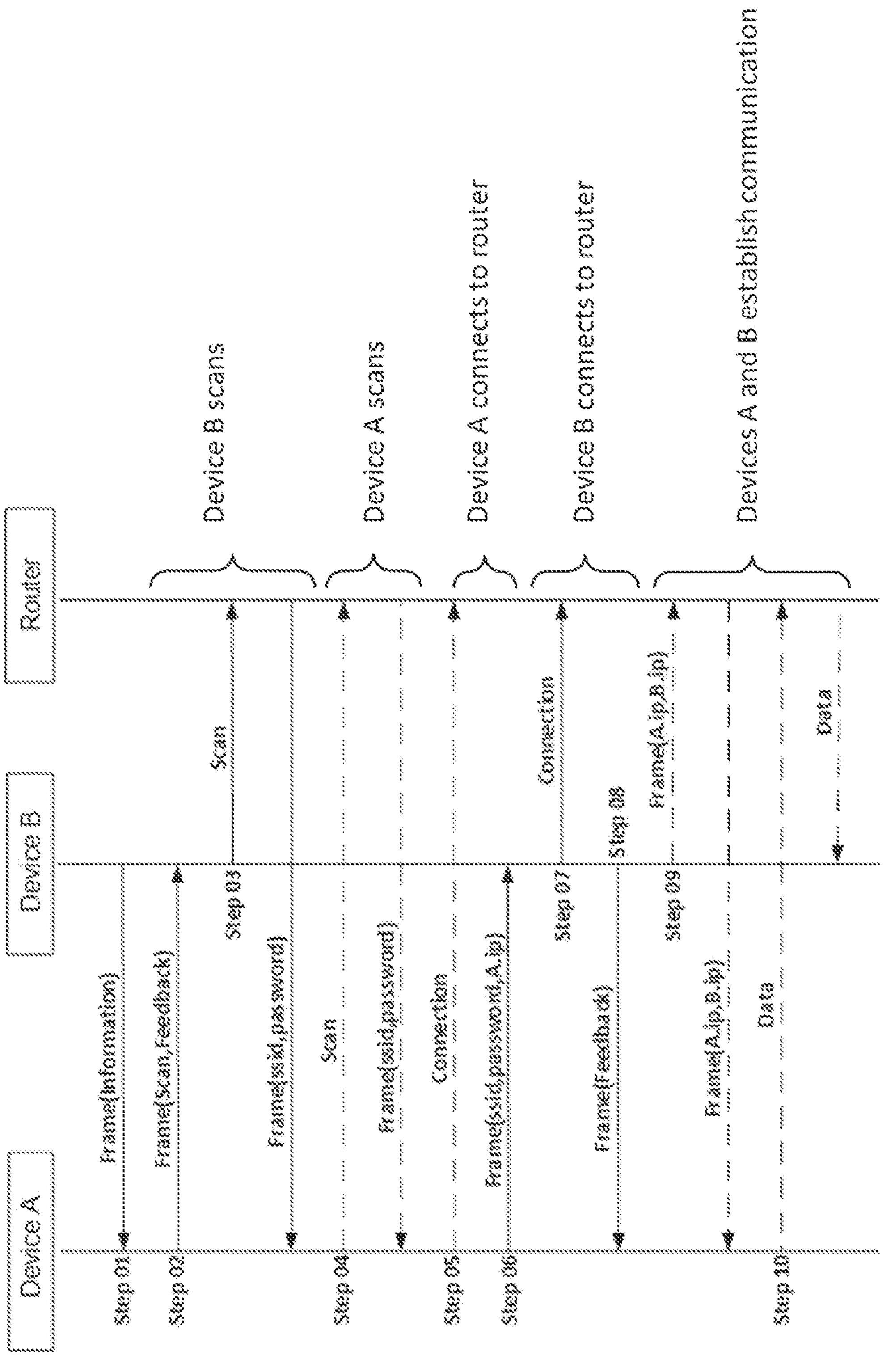
FIG. 5 is a schematic sequence diagram of establishing a communication between two devices through a relay of a router device, in accordance with some example embodiments.

FIG. 5 is a schematic sequence diagram of establishing a communication between two devices through a relay of a router device, in accordance with some example embodiments.

In step 01, Device A and Device B are connected directly. Device A monitors the signal strength of frames transmitted by Device B to determine if the signal strength drops below a threshold, indicating that Device B is about to leave the communication range of Device A (e.g., Basic Service Set (BSS) range).

In step 02, Device A sends a frame about executing a "Scan" command to Device B and instructs Device B to perform a router scan and provide a list of discovered routers back to Device A.

In step 03, Device B performs the "Scan" process and generates a list of discovered routers with Service Set Identifiers (SSIDs) and passwords. Device B sends the router list back to Device A in a frame.

In step 04, Device A also performs the "Scan" process and generates its own router list. Device A compares its list with Device B's list to identify common target routers that both devices can connect to, and stores these routers.

In step 05, From the stored target routers, Device A selects one with the best signal strength and connects to it.

In step 06, Device A sends the credentials such as SSID and password and connection details such as IP address of the connected router to Device B in a frame.

In step 07, Device B receives and stores the credentials and connection details for the router. Device B uses these credentials to connect to the same target router as Device A.

In step 08, Device B sends a frame back to Device A indicating whether it succeeded in connecting to the target router. If unsuccessful, Device A selects a different potential target router to try to connect to.

In step 09, once Device B connects to router successfully, it sends a frame containing its connection details such as IP address to Device A, indicating the new communication route through the router is working.

In step 10, with both devices now connected through the router, Device A and Device B can continue communicating and transmitting data seamlessly even if Device B moves out of the original direct communication range.

It should be noted that one or more of the above steps can be swapped, modified or deleted. One or more new steps can be included in FIG. 5. For example, steps 02-03 can be collectively swapped with step 04 such that Device A may scan before Device B. As another examples, steps 05-06 can be collectively swapped with steps 07-08 such that Device B connects to the target router device before Device A. Such variations are still within the protection scope of the present disclosure.

FIG. 6 illustrates two example lists 602 and 604 of scanned surrounding router devices, in accordance with some example embodiments. List 602 may be generated by Device B after scanning for nearby routers in Step 03. List 604 may be generated by Device A after scanning in Step 04. The SSID refers to the Service Set Identifier, which is the name of the network. The signal strength of each router is shown in terms of the Received Signal Strength Indicator (RSSI), e.g., weak, medium, strong, etc. In some examples, a signal with an absolute signal strength of −80 dBm or lower is considered to be a weak signal. A signal with an absolute signal strength between −60 to −79 dBm is considered to be a medium signal. A signal with an absolute signal strength above −59 dBm is considered to be a strong signal. However, this is not limiting. Different chip manufacturers may set up different RSSIs for different devices under different network environment.

The two lists 602 and 604 may be compared to determine a target router device. First, router devices that exist in both lists can be identified. In this case, Router A, Router B, Router C, and Router D may be identified. Then, a target device may be determined among these identified devices that exist in both lists based on their signal strengths. For example, Router C is determined to be the target device since its signal strength is strong in each list. It may be noted that Router C's password was not originally known to Device A. However, Device A can learn the Router C's password based on the first list 602 it received from Device B. When Router C is determined to be the target router device, Device A and Device B may communicate with each other through Router C such that a wider communication range can be reached.

Figure 7:
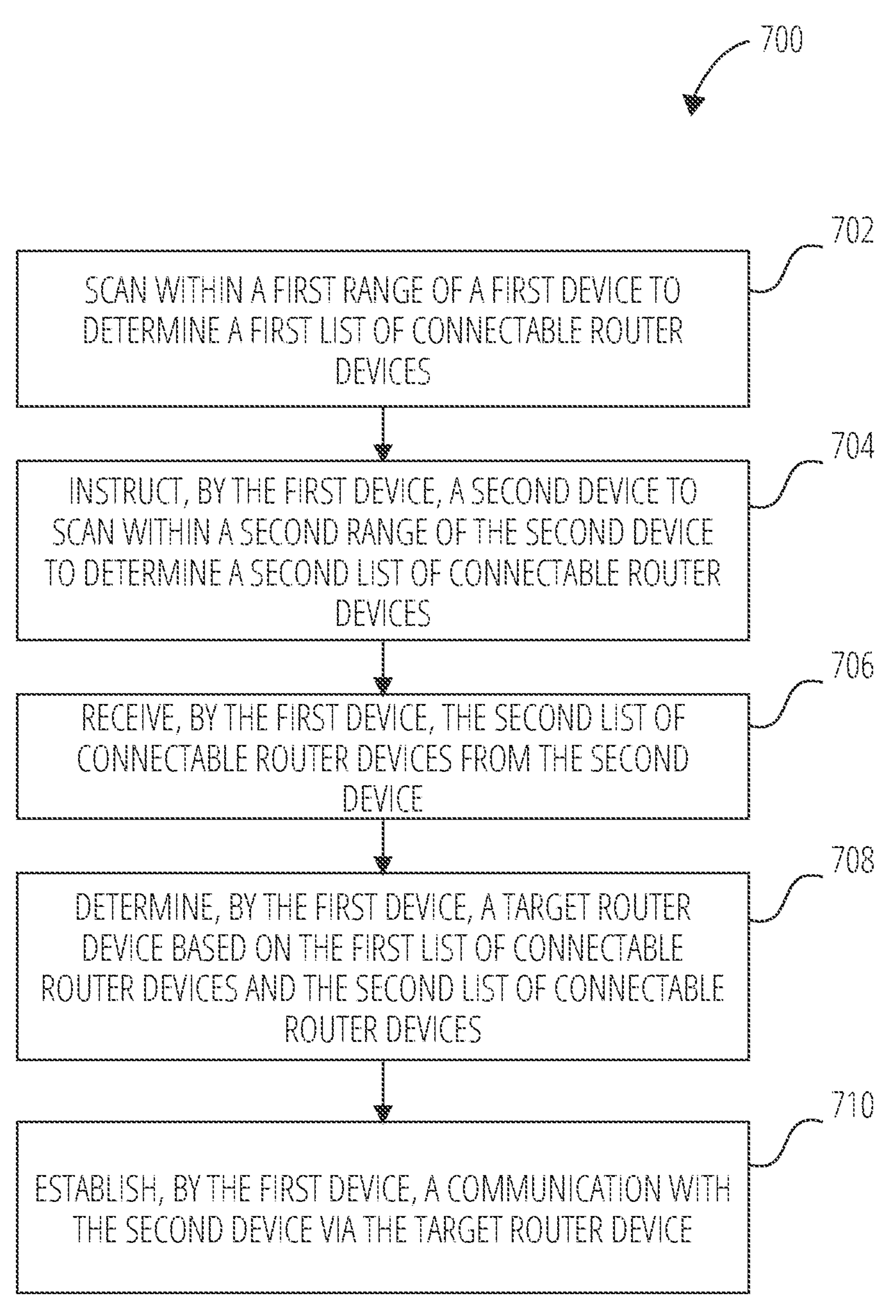
FIG. 7 is a flowchart illustrating operations of a first device in establishing a communication with a second device through a relay of a router device, in accordance with some example embodiments.

FIG. 7 is a flowchart illustrating operations of a first device in establishing a communication with a second device through a relay of a router device, in accordance with some example embodiments. The method 700 may be embodied in computer-readable instructions for execution by one or more processors such that operations of the method 700 may be performed in part or in whole by the functional components of the first device 102 (or second device 104); accordingly, the method 700 is described below by way of example with reference thereto. However, it shall be appreciated that at least some of the operations of the method 700 may be deployed on various other hardware configurations than the first device 102. Also, the operations of the method 700 may be partially omitted, or performed in any order.

In operation 702, the first device 102 may scan within a first range to determine a first list of connectable router devices. The first device 102 scans for wireless signals from nearby router devices and generates a list of discovered routers that are connectable, along with their credentials like SSID and password.

In operation 704, the first device 102 may instruct the second device 104 to scan within a second range of the second device 104 to determine a second list of connectable router devices. For example, the first device 102 directs the second device 104 to scan for routers in its vicinity and generate the second list of connectable router devices along with their credentials like SSID and password.

In operation 706, the first device 102 may receive the second list of connectable router devices from the second device 104.

In operation 708, the first device 102 may determine a target router device based on the first list and second list. For example, the first device 102 compares the two lists to identify a router that exists in both lists and has a strong signal strength to both devices and designates the router as the target router device.

In operation 710, the first device 102 may establish a communication with the second device via the target router device. Specifically, after determining the target router device, the first device 102 connects to target router device and communicates with the second device 104 by relaying signals through the target router device.

Figure 8:
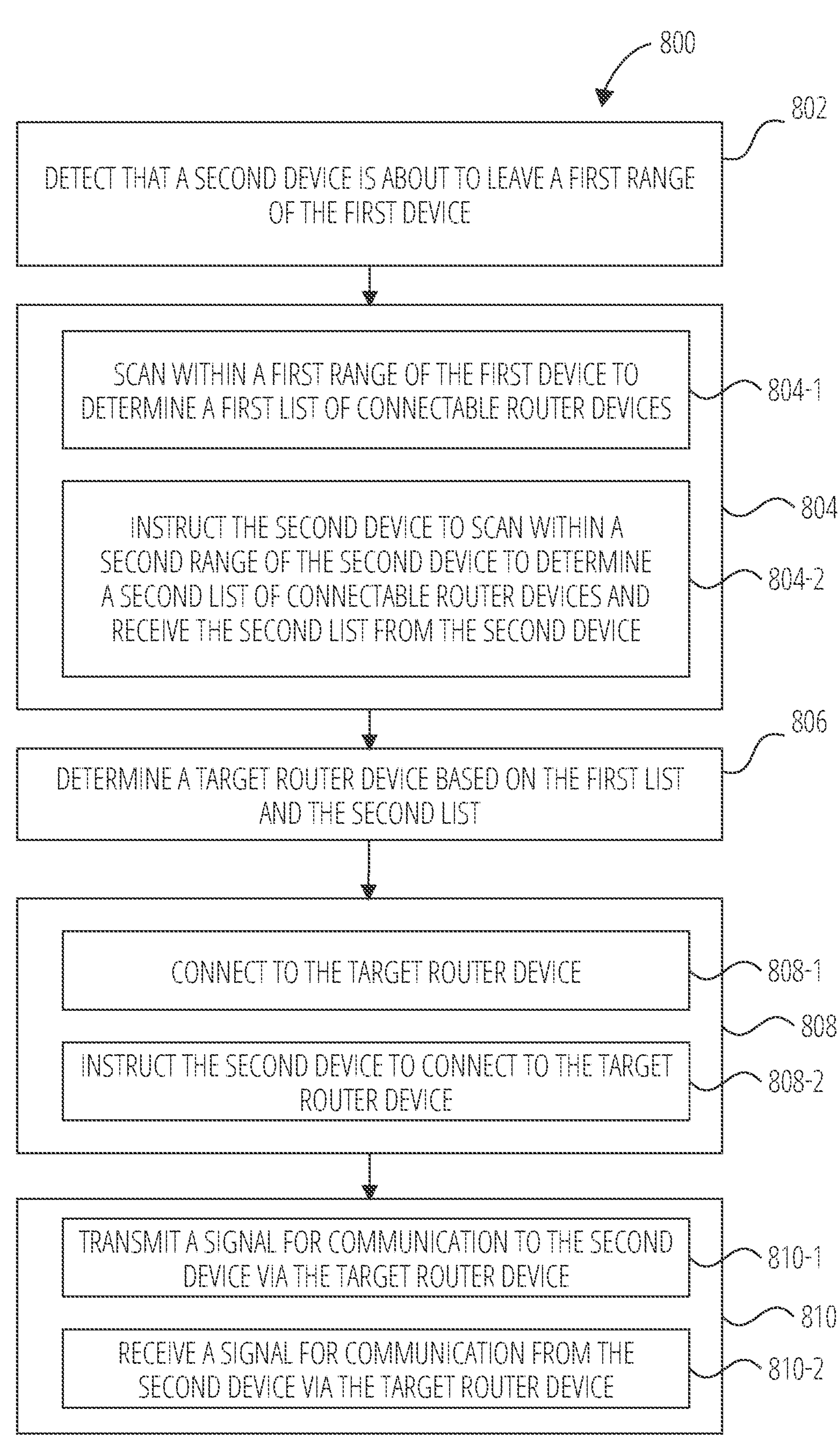
FIG. 8 is a flowchart illustrating operations of a first device in establishing a communication with a second device through connections with a router device, in accordance with some example embodiments.

FIG. 8 is a flowchart illustrating operations of a first device in establishing a communication with a second device through connections with a router device, in accordance with some example embodiments. The method 800 may be embodied in computer-readable instructions for execution by one or more processors such that operations of the method 800 may be performed in part or in whole by the functional components of the first device 102 (or second device 104); accordingly, the method 800 is described below by way of example with reference thereto. However, it shall be appreciated that at least some of the operations of the method 800 may be deployed on various other hardware configurations than the first device 102. Also, the operations of the method 800 may be partially omitted, or performed in any order.

In operation 802, the first device 102 detects that the second device 104 is about to leave a first range of the first device 102. For example, the first device 102 monitors the signal strength of the second device 104 and detects when the strength drops below a threshold, indicating the second device 104 is about to move out of direct communication range.

In operation 804, a first list of connectable devices around the first device and a second list of connectable devices around the second device are discovered by scans. For example, operation 804 includes sub-operations 804-1 and sub-operations 804-2 that can be performed in any order or concurrently. In sub-operation 804-1, the first device 102 may scan within the first range to determine a first list of connectable router devices. In sub-operation 804-2, the first device 102 may instruct the second device 104 to scan within the second range of the second device 104 to determine a second list of connectable router devices.

In operation 806, the first device 102 may determine a target router device based on analyzing and comparing the first list and second list. For example, the first device 102 compares the two lists to identify a router that exists in both lists and has a strong signal strength to both devices and designates the router as the target router device.

In operation 808, the first device 102 and second device 104 can connect to the target router device. For example, operation 808 includes sub-operations 808-1 and 808-2 that can be performed in any order or concurrently. In sub-operation 808-1, the first device 102 may connect to the target router device. In sub-operation 808-2, the first device 102 may instruct the second device 104 to connect to the target router device. For example, the first device 102 sends the credentials of the target router device to the second device 104 and directs the second device 104 to connect to the same target router.

In operation 810, a communication can be established between the first and second devices via the target router. For example, operation 810 includes sub-operations 810-1 and 810-2 that can be performed in any order or concurrently. In sub-operation 810-1, the first device 102 may transmit a signal for communication to the second device 104 via the target router device. In sub-operation 810-2, the first device 102 may receive a signal for communication from the second device 104 via the target router device. When a round of transmitting and receiving signals are completed successfully, the communication is considered as established.

In some examples, the first device 102 may detect that the second device 104 has left the first range of the first device 102 and the first device 102 can continue to communicate with the second device 104 via the target router device.

In some examples, the first list includes a Service Set Identifier (SSID) and a password for each of the connectable devices. The first device 102 may instruct the second device 104 to determine at least one device in the second list based on the first list, wherein the at least one device is not connectable by the second device 104 until the SSID and/or the password of the at least one device is received from the first list sent by first device 102. For example, the at least one device may have a password or is hidden from public.

In some examples, the second list includes a Service Set Identifier (SSID) and a password for each of the connectable devices. The first device 102 may determine the target device based on the second list, wherein the target device is not connectable by the first device until the SSID and/or the password of the target device are received from the second list sent by the second device 104. For example, the target device may have a password or is hidden from public.

In some examples, the first device 102 may monitor a signal strength of the target device. In response to detecting that the signal strength of the target device drops below a threshold, the first device 102 may determine a new target device based on the first list of connectable devices and the second list of connectable devices and establish a new communication with the second device via the new target device.

In some examples, if the original connection between the first device 102 and the second device 104 is lost before the first device 102 and the second device connect with the target router device, the first device 102 and the second device 104 may attempt to send signals to each other through router devices in the first list and the second list. When they receive a signal from each other, a communication can be established.

In some examples, the first device 102 and/or the second device 104 may actively disconnect their original connection after the relay communication through router device is established.

In some examples, the first device 102 and the second device may exchange real-time audio/video data when their communication through the router device is established.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

Examples

1. A method for enhancing a communication range between a first device and a second device communicatively coupled to the first device, the method comprising:
   - scanning within a first range of the first device to determine a first list of connectable devices;
   - instructing, by the first device, the second device to scan within a second range of the second device to determine a second list of connectable devices;
   - receiving, by the first device, the second list of connectable devices from the second device;
   - determining, by the first device, a target device based on the first list of connectable devices and the second list of connectable devices; and
   - establishing, by the first device, a communication with the second device via the target device.

2. The method of example 1, wherein the target device is a router device and the established communication between the first device and the second device via the target device uses a Wi-Fi network.

3. The method of any of examples 1-2, wherein:
   - the scanning within the first range of the first device is performed in response to detecting that the second device is about to leave the first range of the first device; and
   - the detecting that the second device is about to leave the first range of the first device comprises:
   - detecting, by the first device, that a strength of signals received from the second device drops below a threshold.

4. The method of example 3, further comprising:
   - detecting that the second device has left the first range of the first device; and
   - continuing to communicate with the second device via the target device.

5. The method of any of examples 1-4, wherein the target device is a first target device, the method further comprising:
   - determining, by the first device, a second target device based on the first list of connectable devices and the second list of connectable devices; and
   - establishing, by the first device, a communication with the second device via the first target device and the second target device.

6. The method of any of examples 1-5, wherein the determining of the target device based on the first list of connectable devices and the second list of connectable devices comprises:
   - determining a device that exists in both the first list and the second list as the target device.

7. The method of any of examples 1-6, wherein the establishing, by the first device, the communication with the second device via the target device comprises:
   - transmitting, by the first device, a signal for communication to the second device via the target device; or
   - receiving, by the first device, a signal for communication from the second device via the target device.

8. The method of any of examples 1-7, wherein the first list includes a Service Set Identifier (SSID) and a password for each of the connectable devices, the method further comprising:
   - instructing, by the first device, the second device to determine at least one device in the second list based on the first list, wherein the at least one device is not connectable by the second device until the SSID and the password of the at least one device are received from the first list sent by first device.

9. The method of any of examples 1-8, wherein the second list includes a Service Set Identifier (SSID) and a password for each of the connectable devices, the method further comprising:
   - determining, by the first device, the target device based on the second list, wherein the target device is not connectable by the first device until the SSID and the password of the target device are received from the second list sent by the second device.

10. The method of any of examples 1-9, further comprising:
    - monitoring a signal strength of the target device; and
    - in response to detecting that the signal strength of the target device drops below a threshold,
    - determining a new target device based on the first list of connectable devices and the second list of connectable devices; and
    - establishing a new communication with the second device via the new target device.

11. The method of example 10, wherein the determining of the new target device comprises:
    - connecting across each of the first list of connectable devices and the second list of connectable devices until a signal from the second device is received; and
    - designating a device via which the signal is received as the new target device.

12. A computing apparatus comprising:
    - a processor; and
    - a memory storing instructions that, when executed by the processor, configure the apparatus to:
    - scan within a first range of a first device to determine a first list of connectable devices;
    - instruct, by the first device, a second device to scan within a second range of the second device to determine a second list of connectable devices;
    - receive, by the first device, the second list of connectable devices from the second device;
    - determine, by the first device, a target device based on the first list of connectable devices and the second list of connectable devices; and
    - establish, by the first device, a communication with the second device via the target device.

13. The computing apparatus of example 12, wherein:
    - the scanning within the first range of the first device is performed in response to detecting that the second device is about to leave the first range of the first device; and the detecting that the second device is about to leave the first range of the first device comprises:

detecting, by the first device, that a strength of signals received from the second device drops below a threshold.

14. The computing apparatus of example 13, wherein the instructions further configure the apparatus to:

detect that the second device has left the first range of the first device; and continue to communicate with the second device via the target device.

15. The computing apparatus of any of examples 12-14, wherein:

the target device is a first target device; and the instructions further configure the apparatus to:

determine, by the first device, a second target device based on the first list of connectable devices and the second list of connectable devices; and establish, by the first device, a communication with the second device via the first target device and the second target device.

16. The computing apparatus of any of examples 12-15, wherein to determine the target device based on the first list of connectable devices and the second list of connectable devices, the instructions further configure the apparatus to:

determine a device that exists in both the first list and the second list as the target device.

17. The computing apparatus of any of examples 12-16, wherein:

the first list includes a Service Set Identifier (SSID) and a password for each of the connectable devices; and the instructions further configure the apparatus to:

instruct, by the first device, the second device to determine at least one device in the second list based on the first list, wherein the at least one device is not connectable by the second device until the SSID and the password of the at least one device are received from the first list sent by first device.

18. The computing apparatus of any of examples 12-17, wherein:

the second list includes a Service Set Identifier (SSID) and a password for each of the connectable devices; and the instructions further configure the apparatus to:

determine, by the first device, the target device based on the second list, wherein the target device is not connectable by the first device until the SSID and the password of the target device are received from the second list sent by the second device.

19. The computing apparatus of any of examples 12-18, wherein the instructions further configure the apparatus to:

monitor a signal strength of the target device; and in response to detecting that the signal strength of the target device drops below a threshold, determine a new target device based on the first list of connectable devices and the second list of connectable devices; and establish a new communication with the second device via the new target device.

20. A non-transitory computer-readable storage medium, the computer-readable storage medium including instructions that when executed by a computer, cause the computer to:

scan within a first range of a first device to determine a first list of connectable devices;

instruct, by the first device, a second device to scan within a second range of the second device to determine a second list of connectable devices;

receive, by the first device, the second list of connectable devices from the second device;

determine, by the first device, a target device based on the first list of connectable devices and the second list of connectable devices; and establish, by the first device, a communication with the second device via the target device.

CONCLUSION

The present disclosure provides system and methods for extending communication range between wireless devices using relay devices such as routers. Initially, Device A and Device B directly connect within their wireless communication ranges. When Device B is about to move out of Device A's range, Device A detects the decreasing signal strength and determines that range enhancement is needed. Device A scans for routers in its vicinity and generates a first list. Device A instructs Device B to scan and return a second router list. Device A compares the lists to identify routers connectable by both of them. A target router is selected among the identified routers signal strength. The devices then connect to the target router, which relays communication even if Device B moves out of Device A's initial range. If the target router's signal strength drops, Device A and Device B can scan and switch to a substitute router with a stronger signal. The present disclosure potentially has at least the following advantages: 1. Increases wireless communication range without requiring higher transmission power or generating excessive heat. 2. Enables new applications where expanded wireless range is beneficial, such as remote system control, wider home/business coverage, and improved connections for mobile devices. 3. Improves reliability and stability of wireless connections for highly mobile devices like drones or robots. 4. Provides a cost-effective range enhancement solution by utilizing existing router devices rather than requiring specialized long-range wireless hardware.

What is claimed is:

1. A method for enhancing a communication range between a first device and a second device communicatively coupled to the first device, the method comprising:

scanning within a first range of the first device to determine a first list of connectable devices;

instructing, by the first device, the second device to scan within a second range of the second device to determine a second list of connectable devices;

receiving, by the first device, the second list of connectable devices from the second device;

determining, by the first device, a target device based on the first list of connectable devices and the second list of connectable devices; and establishing, by the first device, a communication with the second device via the target device, wherein:

the scanning within the first range of the first device is performed in response to detecting that the second device is about to leave the first range of the first device; and the detecting that the second device is about to leave the first range of the first device comprises:

detecting, by the first device, that a strength of signals received from the second device drops below a threshold.

2. The method of claim 1, wherein the target device is a router device and the established communication between the first device and the second device via the target device uses a Wi-Fi network.

3. The method of claim 1, further comprising:

detecting that the second device has left the first range of the first device; and continuing to communicate with the second device via the target device.

4. The method of claim 1, wherein the target device is a first target device, the method further comprising:

determining, by the first device, a second target device based on the first list of connectable devices and the second list of connectable devices; and establishing, by the first device, a communication with the second device via the first target device and the second target device.

5. The method of claim 1, wherein the determining of the target device based on the first list of connectable devices and the second list of connectable devices comprises:

determining a device that exists in both the first list and the second list as the target device.

6. The method of claim 1, wherein the establishing, by the first device, the communication with the second device via the target device comprises:

transmitting, by the first device, a signal for communication to the second device via the target device; or receiving, by the first device, a signal for communication from the second device via the target device.

7. The method of claim 1, wherein the first list includes a Service Set Identifier (SSID) and a password for each of the connectable devices, the method further comprising:

instructing, by the first device, the second device to determine at least one device in the second list based on the first list, wherein the at least one device is not connectable by the second device until the SSID and the password of the at least one device are received from the first list sent by the first device.

8. The method of claim 1, wherein the second list includes a Service Set Identifier (SSID) and a password for each of the connectable devices, the method further comprising:

determining, by the first device, the target device based on the second list, wherein the target device is not connectable by the first device until the SSID and the password of the target device are received from the second list sent by the second device.

9. The method of claim 1, further comprising:

monitoring a signal strength of the target device; and in response to detecting that the signal strength of the target device drops below a threshold, determining a new target device based on the first list of connectable devices and the second list of connectable devices; and establishing a new communication with the second device via the new target device.

10. The method of claim 9, wherein the determining of the new target device comprises:

connecting across each of the first list of connectable devices and the second list of connectable devices until a signal from the second device is received; and designating a device via which the signal is received as the new target device.

11. A computing apparatus comprising:

a processor; and a memory storing instructions that, when executed by the processor, configure the apparatus to:

scan within a first range of a first device to determine a first list of connectable devices;

instruct, by the first device, a second device to scan within a second range of the second device to determine a second list of connectable devices;

receive, by the first device, the second list of connectable devices from the second device;

determine, by the first device, a target device based on the first list of connectable devices and the second list of connectable devices; and establish, by the first device, a communication with the second device via the target device, wherein:

the first list includes a Service Set Identifier (SSID) and a password for each of the connectable devices; and the instructions further configure the apparatus to:

instruct, by the first device, the second device to determine at least one device in the second list based on the first list, wherein the at least one device is not connectable by the second device until the SSID and the password of the at least one device are received from the first list sent by the first device.

12. The computing apparatus of claim 11, wherein:

the scanning within the first range of the first device is performed in response to detecting that the second device is about to leave the first range of the first device; and the detecting that the second device is about to leave the first range of the first device comprises:

detecting, by the first device, that a strength of signals received from the second device drops below a threshold.

13. The computing apparatus of claim 12, wherein the instructions further configure the apparatus to:

detect that the second device has left the first range of the first device; and continue to communicate with the second device via the target device.

14. The computing apparatus of claim 11, wherein:

the target device is a first target device; and the instructions further configure the apparatus to:

determine, by the first device, a second target device based on the first list of connectable devices and the second list of connectable devices; and establish, by the first device, a communication with the second device via the first target device and the second target device.

15. The computing apparatus of claim 11, wherein to determine the target device based on the first list of connectable devices and the second list of connectable devices, the instructions further configure the apparatus to:

determine a device that exists in both the first list and the second list as the target device.

16. The computing apparatus of claim 11, wherein:

the second list includes a Service Set Identifier (SSID) and a password for each of the connectable devices; and the instructions further configure the apparatus to:

determine, by the first device, the target device based on the second list, wherein the target device is not connectable by the first device until the SSID and the password of the target device are received from the second list sent by the second device.

17. The computing apparatus of claim 11, wherein the instructions further configure the apparatus to:

monitor a signal strength of the target device; and in response to detecting that the signal strength of the target device drops below a threshold, determine a new target device based on the first list of connectable devices and the second list of connectable devices; and establish a new communication with the second device via the new target device.

18. A non-transitory computer-readable storage medium, the computer-readable storage medium including instructions that when executed by a computer, cause the computer to:

scan within a first range of a first device to determine a first list of connectable devices;

instruct, by the first device, a second device to scan within a second range of the second device to determine a second list of connectable devices;

receive, by the first device, the second list of connectable devices from the second device;

determine, by the first device, a target device based on the first list of connectable devices and the second list of connectable devices; and establish, by the first device, a communication with the second device via the target device, wherein:

the second list includes a Service Set Identifier (SSID) and a password for each of the connectable devices; and the instructions further cause the computer to:

determine, by the first device, the target device based on the second list, wherein the target device is not connectable by the first device until the SSID and the password of the target device are received from the second list sent by the second device.

19. A method for enhancing a communication range between a first device and a second device communicatively coupled to the first device, the method comprising:

scanning within a first range of the first device to determine a first list of connectable devices;

instructing, by the first device, the second device to scan within a second range of the second device to determine a second list of connectable devices;

receiving, by the first device, the second list of connectable devices from the second device;

determining, by the first device, a target device based on the first list of connectable devices and the second list of connectable devices;

establishing, by the first device, a communication with the second device via the target device;

monitoring a signal strength of the target device; and in response to detecting that the signal strength of the target device drops below a threshold, determining a new target device based on the first list of connectable devices and the second list of connectable devices; and establishing a new communication with the second device via the new target device.

* * * * *